March 10, 1970   A. WINKLER   3,499,617

CARTRIDGE FOR ROLL FILM

Filed Sept. 6, 1967

INVENTOR.
ALFRED WINKLER

BY Michael J. Striker

United States Patent Office 3,499,617
Patented Mar. 10, 1970

3,499,617
CARTRIDGE FOR ROLL FILM
Alfred Winkler, Munich, Germany, assignor to Agfa-Gevaert Aktiengesellschaft, Leverkusen, Germany
Filed Sept. 6, 1967, Ser. No. 665,761
Claims priority, application Germany, Sept. 8, 1966,
A 26,325
Int. Cl. G11b *15/32*
U.S. Cl. 242—194          16 Claims

ABSTRACT OF THE DISCLOSURE

A cartridge for 8-mm. movie film wherein a housing comprises a partition dividing its interior into a pair of compartments each of which receives a reel. A shaft which can be driven by a reversible motor in a movie camera is journalled in the end walls of the housing and extends through the cores of both reels. A two-way clutch comprises parts mounted on the shaft and on the two reels and serves to drive one of the reels when the shaft rotates in one direction or the other reel when the shaft reverses the direction of its rotation. That part which is mounted on the shaft includes a disk which is turnable about an eccentric pivot pin carried by the shaft and is provided with two teeth each adapted to move into mesh with a gear provided on the respective reel. A friction generating follower of the disk bears against the partition of the housing and turns the disk about the eccentric pin when the shaft reverses the direction of its rotation to thereby move one of the teeth into mesh with the associated gear while the other tooth moves away from the other gear.

BACKGROUND OF THE INVENTION

The present invention relates to cartridges for roll film in general, and more particularly to improvements in cartridges for 8-mm. movie film. Still more particularly, the invention relates to improvements in cartridges of the type wherein the takeup reel or spool is coaxial or nearly coaxial with the supply reel or spool.

Certain movie cameras already utilize cartridges or magazines of the type wherein the two reels are coaxially received in a housing. Such cameras comprise a forward drive including an output member serving to engage one on the reels when the cartridge is properly inserted into the casing of the camera. The output member rotates in one direction and serves to drive the takeup reel so that the latter draws film from the supply reel. In order to rewind exposed film onto the supply reel, the operator must manipulate a crank drive whose output member can engage the supply cartridge at that side of the cartridge which faces away from the output member of the forward drive.

It is also known to provide a movie camera with two coaxial shafts one of which is telescoped into the other shaft. One of these shafts drives the takeup reel when the motor of the camera is caused to rotate in one direction and the other shaft drives the supply reel to rewind exposed film when the direction of rotation of the motor is reversed. Such cameras must be equipped with complicated bearings for the shafts and the cartridges must employ specially designed reels.

It is further known to provide the drive of a movie camera with an axially shiftable output member which is rotated by a reversible motor and engages the takeup reel in one axial position or the supply reel in the other axial position. Such cameras are quite complicated in spite of the fact that the single output member must be shifted by hand, i.e., that the supply reel is not rotated in reverse to collect exposed film in automatic response to a reversal in the direction of rotation of the motor. Also, the operator might forget to shift the output member which will result in serious damage to the film and/or to parts of the camera or cartridge.

SUMMARY OF THE INVENTION

It is an object of my invention to provide a very simple, compact and relatively inexpensive cartridge with two coaxial reels or spools for roll film, particularly 8-mm. movie film, wherein the supply reel is automatically coupled to and driven by the motor of a movie camera when the direction of rotation of the motor is changed upon completed exposure of a length of film and wherein the takeup reel is automatically driven when the operator reverses the direction of rotation of the motor.

Another object of the invention is to provide a cartridge for movie film wherein a single shaft suffices to rotate the supply cartridge in one direction or the takeup cartridge in the other direction and wherein the shaft is automatically disengaged from one reel and drivingly connected with the other reel, or vice versa, in response to a change in the direction of its rotation and without any axial movement of the shaft.

A further object of the invention is to provide a novel two-way clutch which can be built into a cartridge with coaxial reels to transmit motion from a single shaft to one of the reels at a time and which shifts in automatic response to changes in the direction of rotation of the shaft.

An additional object of the invention is to provide a novel housing for a cartridge of the above outlined character.

Still another object of the invention is to provide a cartridge which does not occupy more room than a conventional cartridge for 8-mm. movie film but is provided with means for effecting rotation of its spools or reels in opposite directions in automatic response to changes in the direction of rotation of the motor in a movie camera or movie projector.

A concomitant object of the invention is to provide a cartridge for movie film with automatic rewinding of exposed film onto the supply cartridge which occupies just as little room or no more room than a cartridge wherein the exposed film must be rewound by hand.

The improved cartridge comprises a housing which accommodates two coaxial reels, drive means which preferably takes the shape of a shaft journalled in the end walls of the housing to extend through the cores of the reels and having an end portion which is automatically or manually coupled to the reversible motor of a movie camera or projector when the cartridge is properly inserted into the chamber of such apparatus, and a two-way clutch which is driven by the shaft and comprises two motion transmitting members each movable into motion transmitting engagement with one of the reels. The arrangement is such that one motion transmitting member engages the associated reel and when the motor changes the direction of rotation of the shaft from clockwise to counterclockwise and that the other motion transmitting member engages the other reel when the motor causes the shaft to change the direction of its rotation from counterclockwise to clockwise. The clutch further comprises friction generating means provided on the housing and on a carrier which supports the motion transmitting members and shares rotary movements of the shaft but with some freedom of movement relative to the shaft. The friction generating means displaces the carrier when the shaft changes the direction of its rotation to thereby move the one or the other motion transmitting member into engagement with the associated reel.

The novel features which are considered as characteristic of the invention are set forth in particular in the appended claims. The improved cartridge itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMODIMENTS

Figure 1:
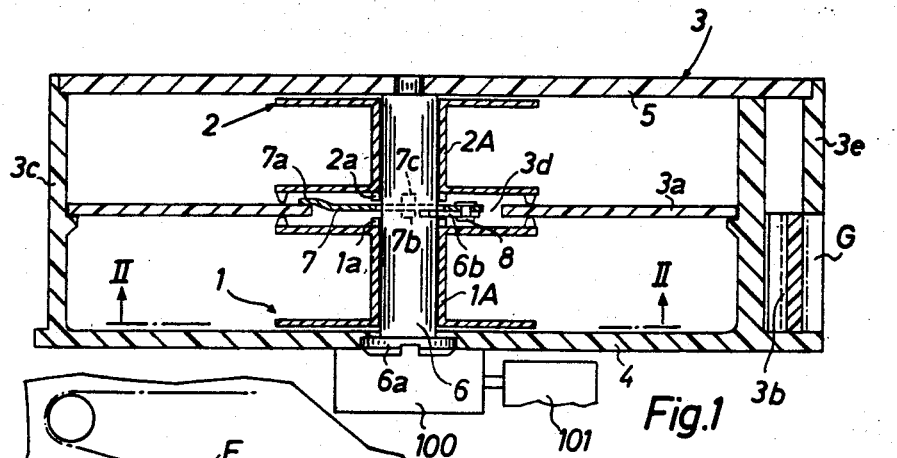
FIG. 1 is an axial sectional view of a cartridge for roll film which embodies one form of my invention.
Figure 2:
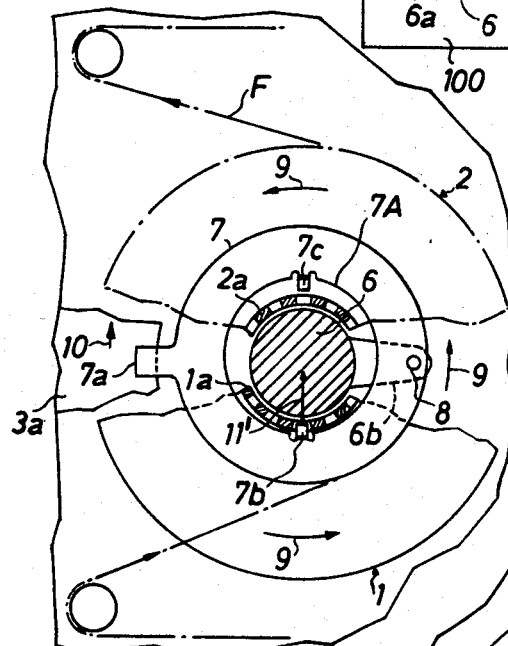
FIG. 2 is a fragmentary horizontal sectional view as seen in the direction of the arrows from the line II—II in FIG. 1, a portion of one of the reels being indicated by phantom lines.

Referring first to FIGS. 1 and 2, there is shown a cartridge for movie film F which comprises a box-shaped housing 3 having a substantially annular side wall 3c, a first end wall 4 and a detachable second end wall or cover 5 which normally closes and seals the open end of the side wall 3c. A disk-shaped intermediate wall or partition 3a divides the interior of the housing 3 into two compartments each of which accommodates one of two spools or reels 1, 2. These reels are coaxial with each other and the partition 3a has a central opening or aperture 3d which extends between the cylindrical cores 1A, 2A of the reels. The housing 3 further defines a film channel 3b through which the film F can travel from the one compartment to the other compartment, or vice versa, so that successive film frames advance past a film gate G. That (flat) portion 3e of the housing 3 which defines the channel 3b and gate G can form an integral part of the end wall 5, i.e., it is then detachable from the remainder of the housing together with the end wall 5. Furthermore, the two end walls 4, 5 and the portion 3e may form a first integral unit and the side wall 3c and partition 3a may form a second integral unit which is insertable into the first unit. Still further, the side wall 3c may be integral with the film channel 3b and may be insertable into a housing including the walls 4, 5 and the portion 3e. Such housing may be of pentagonal outline.

In many heretofore known cartridges for movie film wherein the supply reel is coaxial with the takeup reel, only the take-up reel is normally provided with a coupling portion which enables the motor of the movie camera to rotate the takeup reel in order to draw unexposed film from the supply reel. As a rule, the core of the takeup reel can be coupled with a shaft which receives motion from the motor of the movie camera. In accodance with the present invention, the cartridge is provided with drive means which can rotate the reel 1 or 2. Such drive means comprises a shaft 6 which is rotatable in the end walls 4 and 5 and extends through the cores 1A, 2A of the reels 1 and 2. The end portion or head 6a of this shaft extends beyond the end wall 4 and constitutes one element of a coupling 100 the other element of which receives motion from a motor 101 when the cartridge is properly inserted into the movie camera and when the motor is started. As a rule, a movie camera utilizing cartridges of the type shown in the drawing will be provided with a reversible electric motor 101 which drives the coupling 100 through the intermediary of a friction clutch, not shown. The aforementioned aperture 3d of the partition 3a accommodates a radially extending projection or lug 6b of the shaft 6. The aperture 3d is large enough to permit unimpeded rotation of the lug 6b when the motor 101 drives the shaft 6. The lug 6b forms the driving element for a reversible or two-way clutch which can drive the reel 1 in a first direction or the reel 2 in a second direction. This reversible clutch comprises a disk-shaped carrier 7 (hereinafter called disk) which is coupled to the lug 6b by means of an eccentric pivot pin 8. The axis of the pin 8 is parallel to the common axis of the reels 1 and 2. The disk 7 comprises a follower in the form of a tongue 7a which is located diametrically opposite the pin 8 and can slide along one side of the partition 3a, i.e., along the material surrounding the aperture 3d. The disk 7 is preferably elastic so that the follower 7a bears against the partition 3a due to inherent elasticity of the disk. The disk 7 has a central opening or aperture 7A whose diameter exceeds considerably the diameter of the shaft 6. Two motion transmitting teeth 7b, 7c of the disk 7 extend radially inwardly into the aperture 7A and are located diametrically opposite each other (see FIG. 2). As shown in FIG. 1, the tooth 7b extends to one side and the tooth 7c extends to the other side of the general plane of the disk 7, i.e., each of these teeth has a portion extending radially toward and a portion extending in parallelism with the axis of the shaft 6. The teeth 7b, 7c are disposed in a plane which is substantially normal to the plane including the pivot pin 8 and follower 7a.

The cores 1A, 2A of the reels 1, 2 are respectively provided with annuli of motion receiving teeth 1a, 2a which surround the shaft 6. The external diameters of these annuli are smaller than the shortest distance between the motion transmitting teeth 7b, 7c so that, when the tooth 7b meshes with two of the teeth 1a on the core 1A of the reel 1, the tooth 7c is disengaged from the teeth 2a on the core 2A of the reel 2, or vice versa. The teeth 1a, 2a together form two gears and constitute the motion receiving members of the aforementioned reversible clutch whereby the tooth 7b and gear 1a are inactive when the tooth 7c drives the gear 2a, or vice versa. Though FIG. 2 shows that each of the gears 1a, 2a comprises a relatively large number of teeth, it suffices if each of these gears is provided with a single tooth or with, for example, four equidistant teeth. It is preferred to make the reels 1, 2 of suitable synthetic plastic material and to form the gears 1a, 2a as integral parts of the respective reels, for example, in an injection molding or like machine.

For the sake of clarity, FIG. 2 merely shows substantially one-half of the reel 1 and substantially one-half of the reel 2.

The operation is as follows:

The reel 1 is the takeup reel and the reel 2 is the supply reel. The shaft 6 has its end portion 6a coupled to the friction clutch and is driven by the motor 101 of a movie camera in the direction indicated by arrows 9. The pin 8 of the lug 6b drives the disk 7 whereby the follower 7a causes the disk to turn about the axis of the pin 8 until the tooth 7b engages the gear 1a and drives the reel 1 in the direction indicated by arrows 9. The direction in which the tooth 7b moves substantially radially toward the axis of the shaft 6 when the latter begins to rotate is indicated in FIG. 2 by the arrow 11'. Such radial movement of the tooth 7b is due to friction between the partition 3a and follower 7a; while the tooth 7b moves toward engagement with the gear 1a, the follower 7a travels in the direction indicated by arrow 10. The tooth 7b thereupon remains in mesh with the gear 1a until the operator decides to change the direction of rotation of the shaft 6. If the tooth 7b is disengaged from the gear 1a when the shaft 6 is arrested, it returns to the position shown in FIG. 2 as soon as the motor 101 is started again in a sense to drive the shaft 6 in the direction indicated by arrows 9.

If the direction of the motor 101 is reversed, for example, to produce a fadeout or another special effect, the shaft 6 rotates in a clockwise direction, as viewed in FIG. 2, and the follower 7a travels in a direction counter to that indicated by the arrow 10 so as to turn the disk 7 about the axis of the pin 8 until the tooth 7c moves into mesh with the gear 2a to rotate the reel 2 in a clockwise direction. The tooth 7b is disengaged from the gear 1a so that the shaft 6 drives only the reel 2 through the intermediary of the disk 7, its tooth 7c and gear 2a.

Figure 3:
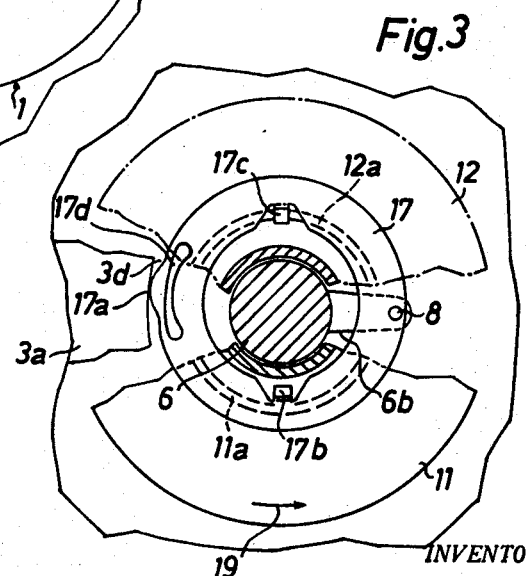
FIG. 3 is a similar fragmentary horizontal sectional view of a modified cartridge.

In the embodiment of FIG. 3, the disk 17 of the reversible clutch comprises an arcuate slot 17 inwardly adjacent to a follower or lobe 17a which bears against the internal surface of the partition 3a, namely, against that surface which surrounds the aperture 3d. The ends of the follower 17a are connected to the main portion of the disk 17 by narrow webs so that the follower is elastic and can move radially toward and away from the axis of the shaft 6 to remain in constant frictional engagement with the partition 3a.

The motion transmitting teeth 17b, 17c of the disk 17 correspond to the teeth 7b, 7c of the disk 7 and can move into mesh with motion receiving gears 11a, 12a provided on the reels 11, 12. The gears 11a, 12a are disposed at the opposite sides of the partition 3a, and the distance between the teeth 17b, 17c is less than the internal diameter of the gear 11a or 12a. The pivot pin 8 is mounted on the lug 6b of the shaft 6 and the latter can be rotated in a clockwise or in a counterclockwise direction by an electric motor or the like installed in a movie camera.

If the shaft 6 is driven in a counterclockwise direction (arrow 19), the follower 17a turns the disk 17 on the pivot pin 8 until the tooth 17c moves radially outwardly (not radially inwardly as the tooth 7b or 7c) and engages two teeth of the gear 12a on the reel 12. During such movement of the tooth 17c, the follower 17a moves slightly toward the axis of the revolving shaft 6. If the shaft 6 is rotated in a clockwise direction, the follower 17a causes the disk 17 to turn on the pivot pin 8 and to move the tooth 17b radially outwardly into mesh with the gear 11a of the reel 11.

An important advantage of the clutch shown in FIG. 3 is that the disk 17 is not subjected to axial stresses because the follower 17a bears against the internal surface of the partition 3a. Furthermore, this clutch will operate properly even if the reels 11, 12 are not accurately centered with reference to the shaft 6.

Of course, the improved cartridge is susceptible of many additional modifications. For example, the lug 6b and pivot pin 8 can be omitted if the shaft 6 is provided with two radially extending pins which are disposed diametrically opposite each other (in a plane which is normal to the common plane of the axis of the shaft 6 and follower 7a or 17a) and extend into radially extending recesses or notches of the disk 7 or 17. Such pins permit the disk to move one of its teeth toward or away from the corresponding gear (radially of the shaft 6) when the other tooth respectively moves away or toward the other gear. It is also possible to provide the partition 3a with an internal annular groove which receives the follower of the disk, or to employ an elastic ring which biases the follower 7a of FIGS. 1 and 2 against the one or the other side of the partition 3a. Furthermore, the shaft 6 can be driven by a spring motor or by means of a manually operated crank drive in order to rewind exposed movie film on the supply reel.

The material of the disk 7 or 17 (or at least the material of the follower 7a or 17a) is preferably selected in such a way that the follower can produce sufficient friction to turn the disk on the pivot pin 8 when the shaft 6 changes its direction of rotation.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. A cartridge for roll film, particularly, for 8-mm. motion picture film, comprising a housing; a pair of substantially coaxial reels rotatable in said housing and each including motion receiving means; reversible rotary drive means extending into said housing and substantially coaxial with said reels; two-way clutch means for respectively connecting said drive means with the one and the other of said reels in response to rotation of said drive means in first and second directions, said clutch means comprising a carrier movably coupled to said drive means and including first and second motion transmitting means; and cooperating friction generating means provided on said carrier and said housing for moving said carrier with reference to said reels in response to changes in the direction of rotation of said drive means and for respectively maintaining said first and second motion transmitting means in engagement with the motion receiving means of said one and said other reel when the drive means respectively rotates in said first and second directions.

2. A cartridge as defined in claim 1, wherein said clutch means further comprises connecting means coupling said carrier to said drive means with limited freedom of movement between said carrier and said drive means sufficient to place one of said motion transmitting means into engagement with one of said motion receiving means when the other motion transmitting means is disengaged from the other motion receiving means and vice versa.

3. A cartridge as defined in claim 1, wherein each of said motion transmitting means constitutes a radial tooth of said carrier and wherein said teeth are disposed substantially diametrically opposite each other with reference to the axis of said drive means.

4. A cartridge as defined in claim 1, wherein said carrier comprises a disk and wherein said reels comprise cores disposed at the opposite sides of the said disk.

5. A cartridge as defined in claim 4, wherein said motion transmitting means extend axially of said disk but in opposite directions.

6. A cartridge as defined in claim 1, wherein said motion receiving means constitute annuli of teeth provided on the respective reels and said motion transmitting means are disposed diametrically opposite each other with reference to the axis of said drive means, the minimal distance between said motion transmitting means exceeding the outer diameters of said annuli.

7. A cartridge as defined in claim 6, wherein said carrier is a disk and said teeth are adjacent to the periphery of said disk, said clutch means further comprising a pivot pin connecting said disk to said drive means for turning movement about a further axis which is spaced from the axis of said drive means.

8. A cartridge as defined in claim 7, wherein said disk has a central opening which receives with clearance a portion of said drive means so that the disk and turn about said further axis.

9. A cartridge as defined in claim 1, wherein said reels have hollow cores and said housing comprises two end walls each outwardly adjacent to one of said reels, said drive means comprising a shaft rotatably journalled in said end walls and extending through said cores, said carrier comprising a disk disposed between said cores and being movable within limits substantially radially of said shaft.

10. A cartridge for roll film, particularly for 8-mm. motion picture film, comprising a housing; a pair of substantially coaxial reels rotatable in said housing; reversible rotary drive means extending into said housing and substantially coaxial with said reels; two-way clutch means for connecting said drive means with one of said reels in response to rotation of said drive means in a first direction and for connecting said drive means with the other reel in response to rotation of said drive means in a second direction, said clutch means comprising a carrier, a pair of motion transmitting members provided on said carrier, a motion receiving member provided on each of said reels and cooperating with one of said motion transmitting members when the drive means rotates in the respective direction, and connecting means securing said carrier for rotation with said drive means with limited freedom of movement between said carrier and said drive means sufficient to place one of said motion transmitting members into engagement with one of said motion receiving members when the other motion transmitting member is disengaged from the other motion receiving member; and cooperating friction generating means provided on said housing and said carrier to move the carrier with reference to said drive means to a first operative position in which the one motion transmitting member engages the one motion receiving member in response to rotation of said drive means in one direction and to a second operative position in which the other motion transmitting member engages the other motion receiving member in response to rotation of said drive means in the other direction, said friction generating means comprising a wall on said housing and a follower provided on said carrier and bearing against said wall.

11. A cartridge for roll film, particularly for 8-mm. motion picture film, comprising a housing; a pair of substantially coaxial reels rotatable in said housing; reversible rotary drive means extending into said housing and substantially coaxial with said reels; two-way clutch means for connecting said drive means with one of said reels in response to rotation of said drive means in a first direction and for connecting said drive means with the other reel in response to rotation of said drive means in a second direction, said clutch means comprising a carrier, a pair of motion transmitting members provided on said carrier, each of said motion transmitting members constituting a radial tooth of said carrier and said teeth being disposed substantially diametrically opposite each other with reference to the axis of said drive means, a motion receiving member provided on each of said reels and each cooperating with one of said motion transmitting members when said drive means rotates in the respective direction, and connecting means securing said carrier for rotation with said drive means with limited freedom of movement between said carrier and said drive means sufficient to place one of said motion transmitting members into engagement with one of said motion receiving members when the other motion transmitting member is disengaged from the other motion receiving member; and cooperating friction generating means provided on said housing and said carrier to move the carrier with reference to said drive means to a first operative position in which the one motion transmitting member engages the one motion receiving member in response to rotation of said drive means in one direction and to a second operative position in which the other motion transmitting member engages the other motion receiving member in response to rotation of said drive means in the other direction, said friction generating means comprising a wall on said housing and a follower provided on said carrier and bearing against said wall, said follower being located substantially midway between said teeth.

12. A cartridge for roll film, particularly for 8-mm. motion picture film, comprising a housing; a pair of substantially coaxial reels rotatable in said housing; reversible rotary drive means extending into said housing and substantially coaxial with said reels; and two-way clutch means for connecting said drive means with one of said reels in response to rotation of said drive means in a first direction and for connecting said drive means with the other reel in response to rotation of said drive means in a second direction, said clutch means comprising a carrier including a disk disposed between said reels and having a follower, connecting means securing said carrier for rotation with said drive means, a pair of motion transmitting members provided on said carrier, and a motion receiving member provided on each of said reels and each cooperating with one of said motion transmitting members when the drive means rotates in the respective direction, said housing comprising a partition having a portion surrounding said disk and frictionally engaging said follower, said disk being movable within limits with reference to said drive means in response to friction between said follower and said partition whereby such friction suffices to place one of said motion transmitting members into engagement with the corresponding motion receiving member when said drive means rotates.

13. A cartridge for roll film, particularly for 8-mm. motion picture film, comprising a housing; a pair of substantially coaxial reels rotatable in said housing; reversible rotary drive means extending into said housing and substantially coaxial with said reels; two-way clutch means for connecting said drive means with one of said reels in response to rotation of said drive means in a first direction and for connecting said drive means with the other reel in response to rotation of said drive means in a second direction, said clutch means comprising a carrier including a disk, connecting means coupling said disk for rotation with said drive means with limited freedom of movement relative to said drive means, a pair of motion transmitting members provided on said carrier and including teeth disposed substantially diametrically opposite each other with reference to the axis of said drive means, and a motion receiving member provided on each of said reels and each cooperating with one of said motion transmitting members when said drive means rotates in the respective direction, said motion receiving members comprising gears provided on said reels and having internal diameters exceeding the shortest distance between said teeth; and cooperating friction generating means provided on said disk and said housing to move said disk to a first operative position in which one of said teeth moves away from the axis of said drive means and into mesh with one of said gears when said drive means rotates in one direction and to move said disk to a second operative position in which the other tooth meshes with the other gear when said drive means rotates in the other direction.

14. A cartridge for roll film, particularly for 8-mm. motion picture film, comprising a housing; a pair of substantially coaxial reels rotatable in said housing; reversible rotary drive means extending into said housing and substantially coaxial with said reels; and two-way clutch means for connecting said drive means with one of said reels in response to rotation of said drive means in a first direction and for connecting said drive means with the other reel in response to rotation of said drive means in a second direction, said clutch means comprising a carrier including a disk having a follower in frictional engagement with a portion of said housing, said follower constituting a resilient lobe of said disk and engaging an edge face bounding an aperture in said portion of the housing, connecting means securing said carrier for rotation with said drive means, a pair of motion transmitting members provided on said carrier, and a motion receiving member provided on each of said reels and each cooperating with one of said motion transmitting members when said drive means rotates in the respective direction.

15. A cartridge for roll film, particularly for 8-mm. motion picture film, comprising a housing; a pair of substantially coaxial reels rotatable in said housing and having hollow cores, said housing comprising two end walls each outwardly adjacent to one of said reels; reversible rotary drive means extending into said housing and substantially coaxial with said reels, said drive means comprising a shaft rotatably journalled in said end walls and extending through said cores, said shaft having a radially extending portion; and two-way clutch means for connecting said drive means with one of said reels in response to rotation of said drive means in a first direction and for connecting said drive means with the other reel in response to rotation of said drive means in a second direction, said clutch means comprising a carrier including a disk disposed between said cores and being movable within limits radially of said shaft, connecting means securing said carrier for rotation with said drive means and including a pin turnably connecting said disk to the radially extending portion of said shaft, said disk having a central aperture large enough to permit some pivotal movements of the disk on said pin, a pair of motion transmitting members provided on said carrier, and a motion receiving member provided on each of said reels and each cooperating with one of said motion transmitting members when the drive means rotates in the respective direction.

16. A cartridge for roll film, particularly for 8-mm. motion picture film, comprising a housing; a pair of substantially coaxial reels rotatable in said housing and having hollow cores, said housing comprising two end walls each outwardly adjacent to one of said reels; reversible rotary drive means extending into said housing and substantially coaxial with said reels, said drive means comprising a shaft rotatably journalled in said end walls and extending through said cores; and two-way clutch means for connecting said drive means with one of said reels in response to rotation of said drive means in a first direction and for connecting said drive means with the other reel in response to rotation of said drive means in a second direction, said clutch means comprising a carrier including a disk disposed between said cores and movable within limits substantially radially of said shaft, said housing further including a partition disposed intermediate said end walls and having an aperture accommodating said disk with clearance and said disk having a follower bearing against said partition so that said partition moves said disk with reference to said shaft in response to a change in direction of rotation of said shaft, connecting means securing said carrier for rotation with said drive means, a pair of motion transmitting members provided on said carrier, and a motion receiving member provided on each of said reels and each cooperating with one of said motion transmitting members when said drive means rotates in the respective direction.

References Cited
UNITED STATES PATENTS

| | | | |
|---|---|---|---|
| 1,310,211 | 7/1919 | Philpot. | |
| 1,525,990 | 2/1925 | Howell. | |
| 2,756,940 | 7/1956 | Lessler | 242—71.2 |
| 2,998,938 | 9/1961 | Wettering. | |

GEORGE F. MAUTZ, Primary Examiner